(12) United States Patent
Vorhis

(10) Patent No.: US 6,530,661 B1
(45) Date of Patent: Mar. 11, 2003

(54) EYE GLASSES HOLDER HAVING A BODY OF REVOLUTION AND A SUCTION CUP

(76) Inventor: Daniel J. Vorhis, 21910 State Rte. 525, Whiskey Island, Freeland, WA (US) 98249

( * ) Notice: Subject to any disclaimer, the term of this patent is extended or adjusted under 35 U.S.C. 154(b) by 0 days.

(21) Appl. No.: 09/609,999

(22) Filed: Jul. 5, 2000

(51) Int. Cl.[7] .................................................. G02C 1/00
(52) U.S. Cl. .......................... 351/158; 248/902; 206/5
(58) Field of Search ........................... 351/41, 158, 47, 351/57; 248/200, 902, 316.8; 206/5; 211/85.1

(56) References Cited

U.S. PATENT DOCUMENTS

| | | | | |
|---|---|---|---|---|
| 2,467,251 A | * | 4/1949 | Bowman | 248/902 |
| 3,259,348 A | * | 7/1966 | Dann | 248/902 |
| 4,542,965 A | * | 9/1985 | Shedrow | 351/57 |
| 4,576,320 A | | 3/1986 | Mead | 224/311 |
| 4,695,026 A | | 9/1987 | Medley, Jr. | 248/316.5 |
| 4,715,575 A | | 12/1987 | Kamerer | 248/309 |
| 4,779,829 A | | 10/1988 | Rocke et al. | 248/206 |
| 4,867,402 A | | 9/1989 | Benson et al. | 248/206 |
| 4,903,925 A | | 2/1990 | Dark | 248/206 |
| 5,000,410 A | | 3/1991 | Beavers | 248/205 |
| 5,046,696 A | | 9/1991 | Lee | 248/309.1 |
| 5,372,345 A | | 12/1994 | Schmidt | 248/231.8 |
| 5,964,437 A | * | 10/1999 | Belokin et al. | 248/205.5 |
| 6,039,173 A | | 3/2000 | Crow | 206/5 |
| 6,102,346 A | * | 8/2000 | Visser | 248/200 |
| 6,131,865 A | * | 10/2000 | Adams | 248/206.2 |

* cited by examiner

Primary Examiner—Hung Xuan Dang
(74) Attorney, Agent, or Firm—Holland & Hart

(57) ABSTRACT

The holder is an elastomeric body of revolution having a suction cup portion and a knob portion joined by a neck portion such that there is a circumferential groove between the suction cup and knob portions. In use, the suction cup portion holds the holder onto a non-porous surface and eyeglasses can be held in the groove.

18 Claims, 1 Drawing Sheet

EYE GLASSES HOLDER HAVING A BODY OF REVOLUTION AND A SUCTION CUP

BACKGROUND OF THE INVENTION

1. Field

The subject invention is in the field of devices and apparatus used for storing tools, utensils and the like by supporting them on a non-horizontal surface such as a wall or a window in a vehicle. In particular, it is in the field of devices for storing eyeglasses on non-horizontal surfaces, more particularly non-horizontal, non-porous surfaces.

2. Prior Art

There is much prior art in this particular field. The U.S. Patents listed below are a sampling of patented prior art.

| | |
|---|---|
| 4,576,320 | 4,903,925 |
| 4,695,026 | 5,000,410 |
| 4,715,575 | 5,046,696 |
| 4,779,829 | 5,372,345 |
| 4,867,402 | 6,039,173 |

All these patented holders are adapted to supporting eyeglasses on a non-horizontal surface. Those which are attached to the surface using suction cups are adapted for use on non-porous surfaces only. They all comprise one or more parts and means for attaching the part(s) to the surface, means such as Velcro™, adhesive or at least one suction cup.

All these patent prior art eyeglass holders are considered to be unnecessarily complicated and therefore expensive. The primary objective of the subject invention is to provide, for use on non-horizontal, non-porous surfaces, a fully effective and safe holder for eyeglasses that is simpler and less expensive than known prior art holders for eyeglasses.

SUMMARY OF THE INVENTION

The subject invention is an eyeglass holder for use on non-horizontal, non-porous surfaces. For purposes of this disclosure the term eyeglasses covers reading glasses, sunglasses, and corrective lens glasses. The subject holder is one part, a body of revolution, made of elastomeric material. The part comprises a suction cup portion and a knob portion extending from the convex surface of the suction cup, with a neck and a circumferential notch between the cup and knob portions.

In use the holder is attached to a surface by action of the suction cup portion and a pair of eyeglasses is hung in the notch, with the bridge of the eyeglasses in the notch.

The invention is described in more detail below with reference to the attached drawings.

DETAILED DESCRIPTION OF THE INVENTION

Figure 1:
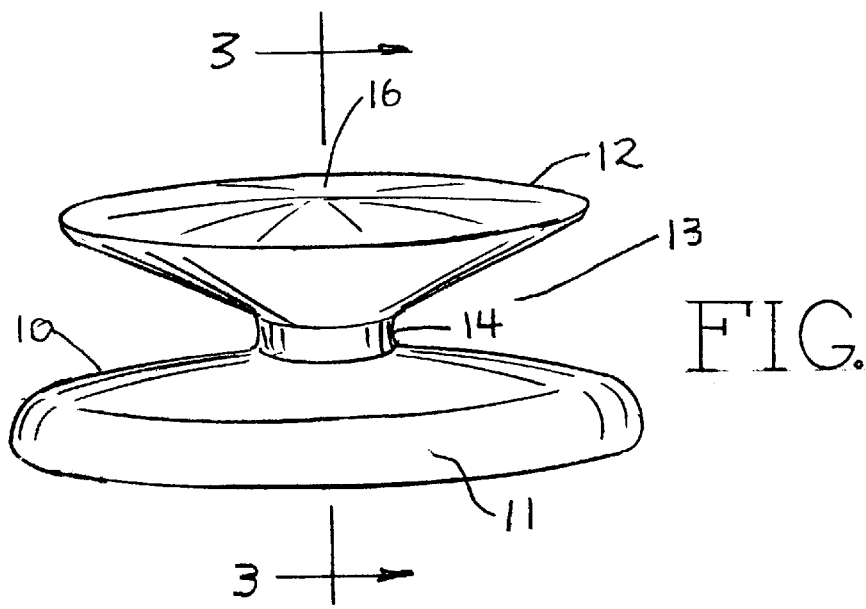
FIG. 1 is a general view of a preferred embodiment of the subject holder, showing primarily the knob portion.
Figure 2:
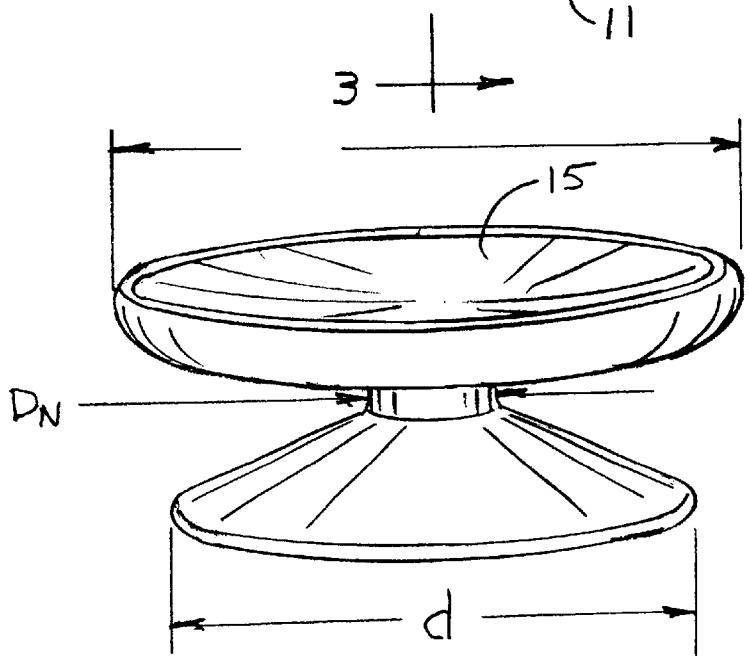
FIG. 2 is a general view of the FIG. 1 embodiment of the invention, showing primarily the suction cup.

The subject invention is a holder for eyeglasses and is for use on non-horizontal, non-porous surfaces. A preferred embodiment of the holder 10 shown in FIG. 1 is a one piece body of revolution having a suction cup portion 11, a knob portion 12, a circumferential groove 13 between them and a short neck portion 14. FIG. 1 shows the flat or, preferably, convex surface 16 of the knob portion. There may be indicia on this surface, for any purpose or combination of purposes. FIG. 2 shows the concave surface 15 of the suction cup portion. The diameter d of the knob portion is in a range of 0.6 to 1.0 of diameter D of the suction cup, with 0.8 preferred. Diameter D is in a range of 2.0 to 4.0 inches with 2.5 inches preferred. The diameter $D_N$ of the neck is in a range of 0.3 to 0.6 inches with 0.5 preferred. The length of the neck is in a range of 0.09 to 0.15 inches with 0.125 preferred.

Figure 3:
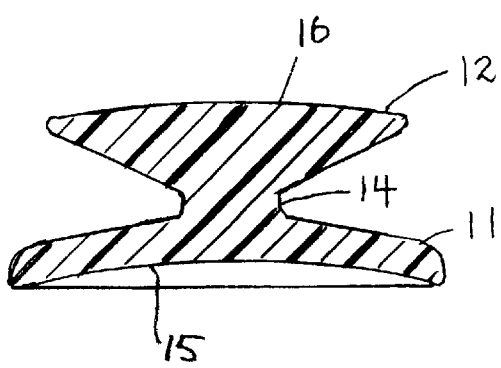
FIG. 3 is a section taken at 3—3 in FIG. 2.

FIG. 3 is a section taken at 3—3 in FIG. 1 with parts numbered as in the other FIGS.

In use the holder is attached to a non-porous surface such as a vehicle window or dashboard and a pair of glasses is placed with its bridge over the neck of the holder. The bows of the glasses may be folded or not. The glasses are securely held and not damaged because of the soft elastomeric material of which the holder is made.

It is considered to be understandable from this description that the subject invention meets its objective. It provides, for use on non-horizontal, non-porous surfaces, a fully effective and safe holder for eyeglasses that is simpler and less expensive than known prior art holders for eyeglasses.

It is also considered to be understood that while one embodiment of the invention is disclosed herein, other embodiments and modifications of the one disclosed are possible within the scope of the invention which is limited only by the attached claims.

I claim:

1. A holder for eyeglasses, said holder being made of elastomeric material, being a body of revolution and comprising a suction cup portion, a knob portion and a neck portion, said knob and suction cup portions being joined by said neck portion;

a circumferential groove between said suction cup and knob portions;

said circumferential groove being sized to hold a bridge portion of a pair of eyeglasses.

2. An eyeglass holder, comprising:

a one-piece body of material, comprising:
   a suction cup;
   a knob;
   a neck interconnecting the suction cup and the knob, the neck defining a circumferential notch formed between the suction cup and the knob, the notch being sized to receive a bridge of a pair of eyeglasses;

wherein the one-piece body comprises a body of revolution such that the one-piece body is substantially identical at all radial locations surrounding an axis of rotation.

3. An eyeglass holder according to claim 2 wherein the one-piece body is made of elastomeric material.

4. An eyeglass holder according to claim 2 wherein the neck notch is configured to hold a pair of eyeglasses.

5. An eyeglass holder according to claim 2 wherein the knob has a convex surface.

6. An eyeglass holder according to claim 2 wherein the suction cup has concave surface.

7. An eyeglass holder according to claim 2 wherein the knob has a convex surface and the suction cup has a concave surface.

8. An eyeglass holder according to claim 2 wherein the knob has a diameter within a range of 0.6 inches to 1.0 inches.

9. An eyeglass holder according to claim 2 wherein the knob has a diameter of 0.8 inches.

10. An eyeglass holder according to claim 2 wherein the suction cup has a diameter within a range of 2.0 inches to 4.0 inches.

11. An eyeglass holder according to claim 2 wherein the suction cup has a diameter of 2.5 inches.

12. An eyeglass holder according to claim 2 wherein the neck has a diameter within a range of 0.3 inches to 0.6 inches.

13. An eyeglass holder according to claim 2 wherein the neck has a diameter of 0.5 inches.

14. An eyeglass holder according to claim 2 wherein the neck has a length within a range of 0.09 inches to 0.15 inches.

15. An eyeglass holder according to claim 2 wherein the neck has a length of 0.125 inches.

16. An eyeglass holder according to claim 2 wherein the knob has a diameter within a range of 0.6 inches to 1.0 inches, the suction cup has a diameter within a range of 2.0 inches to 4.0 inches, the neck has a diameter within a range of 0.3 inches to 0.6 inches, and the neck has a length within a range of 0.09 inches to 0.15 inches.

17. An eyeglass holder according to claim 2 wherein the knob has a diameter of 0.8 inches, the suction cup has a diameter of 2.5 inches, the neck has a diameter of 0.5 inches, and the neck has a length of 0.125 inches.

18. An eyeglass holder, comprising:
   a one-piece body of elastomeric material, comprising:
      a suction cup;
      a knob;
      a neck interconnecting the suction cup and the knob, the neck defining a circumferential notch formed between the suction cup and the knob;
   wherein the one-piece body comprises a body of revolution such that the one-piece body is identical at all radial locations surrounding an axis of rotation;
   wherein the knob has a diameter of 0.8 inches, the suction cup has a diameter of 2.5 inches, the neck has a diameter of 0.5 inches, and the neck has a length of 0.125 inches;
   wherein the notch is configured for hanging a pair of glasses.

* * * * *